Oct. 28, 1941.　　　J. C. SMITH　　　2,260,588
COMBINED CIGAR LIGHTER AND INSTRUMENT PANEL LAMP FOR VEHICLES
Filed Sept. 13, 1940
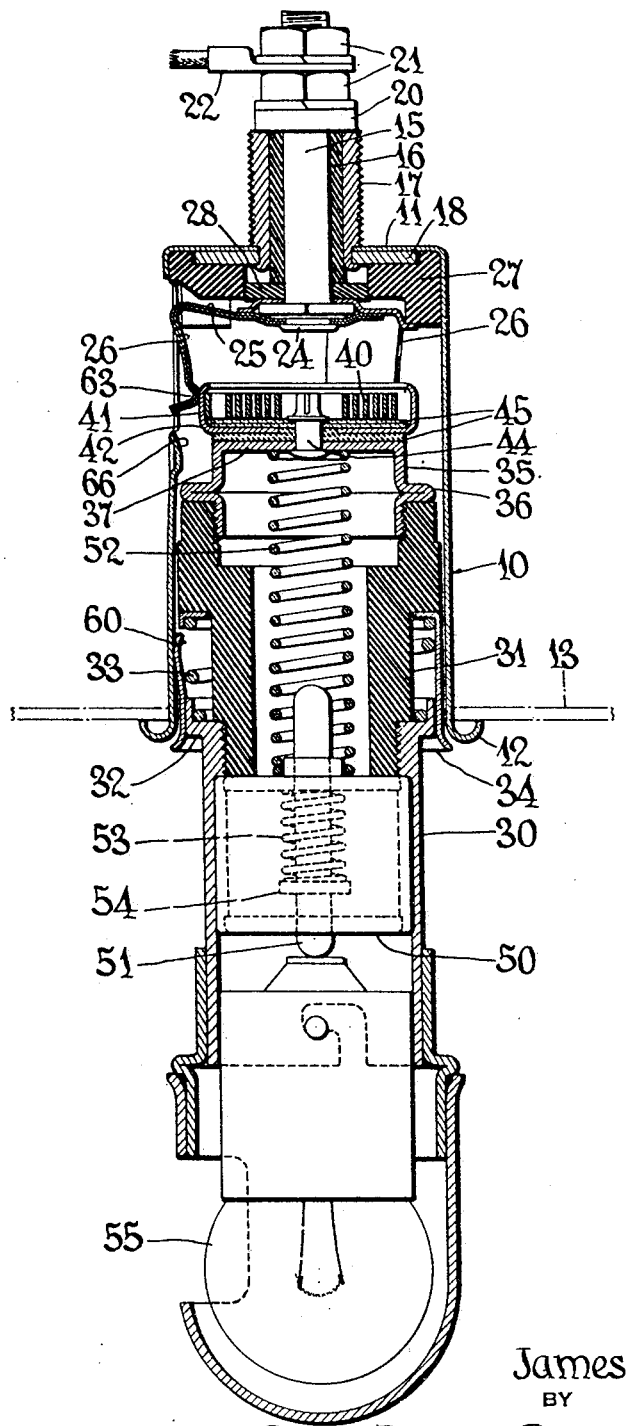
INVENTOR
James C. Smith,
BY
Beau, Brooks, Buckley & Beau. ATTORNEYS Patented Oct. 28, 1941

2,260,588

UNITED STATES PATENT OFFICE 2,260,588

COMBINED CIGAR LIGHTER AND INSTRUMENT PANEL LAMP FOR VEHICLES

James C. Smith, Buffalo, N. Y.

Application September 13, 1940, Serial No. 356,641

3 Claims. (Cl. 240—2)

This invention relates to an accessory which is particularly useful in automotive vehicles and comprises a combined cigar or cigarette lighter and illuminating device.

More particularly, the invention provides an electrically energized cigar or cigarette lighter of the type conventionally found on the instrument panels of motor vehicles wherein the lighter body, after having been heated, may be removed for use. The present invention comprehends the incorporation in such lighter of a convenient lamp for illuminating the area adjacent the instrument panel, wherein such lamp is electrically energized in a manner which produces a novel circuit arrangement for selectively energizing either the lighter or the lamp.

With the present trend toward indirect illumination of instrument panels of automotive vehicles the various indicating dials of such panels are usually adequately illuminated but this trend has resulted in the lack of emanation from such indirectly illuminated dials of light for locating various control knobs and buttons on the instrument panel. For this reason it is highly desirable to provide an auxiliary means of direct illumination for locating the keyhole of an ignition switch and various other control knobs and buttons such as the throttle, choke, light switches, for use in reading memoranda, addresses, maps, and for other purposes.

By utilization of the device of my invention means may be substituted for conventional lighters, such means embodying a combined lighter and dash light, without altering the vehicle-connected portion of the lighter installation in any way. That is, the removable portion of a conventional lighter may merely be removed in the usual fashion and the device forming a part of my invention substituted therefor.

In its preferred form my invention is further characterized by the fact that its dual function is accomplished without the complexity of additional switching or circuit controlling means and merely by adjusting the axial position of the removable portion of the device to render either the lighter or the lamp selectively energizable, or to render both the lighter and the lamp deenergized, if that condition is desired.

The figure in the drawing is a longitudinal, horizontal cross-sectional view through a combined lighter and dash lamp embodying the principles of my invention with the instrument-panel-mounted supporting shell therefor.

In the drawing like characters of reference denote like parts throughout and the numeral 10 designates a tubular shell having an end thereof closed as by a wall 11 and its opposite end provided with an annular flange 12. The shell 10 is disposed in an opening in an instrument panel indicated in dot and dash lines at 13 and the flange 12 engages the front face of the instrument panel to locate the shell in the opening in the instrument panel and provide a suitable framing trim therefor. The shell 10 may be secured in attached position with respect to the panel 13 in any convenient manner.

The end wall 11 of the shell 10 is arranged to support means for introducing a source of electrical energy into the interior of the shell and to this end a conducting screw 15 is disposed coaxially with the shell 10 and extending through the wall 11 thereof. The screw 15 is surrounded by an insulating bushing 16 which is in turn surrounded by a sleeve 17 which is rigidly secured in an opening in the end wall 11 as by riveting or the like. A reinforcing disc 18 may be disposed adjacent the inner surface of the wall 11 and in the illustration such disc is shown included in the rivet connection of the sleeve 17 with the end wall 11. The screw 15 extends outwardly beyond the end of the insulating bushing 16 and is provided, adjacent the end of the latter, with a collar of insulating material designated 20. Beyond the collar 20 the terminal portion of the screw is threaded to receive a pair of nuts 21 which engage therebetween an electrical connector 22.

At its inner end the screw 15 is provided with a head portion 24 which has an annular groove for receiving and supporting a bi-metallic device 25 which comprises a number of circumferentially spaced arms 26, in the present instance three, which cooperate with the removable portion of the lighter and lamp unit in a manner which will presently appear. The screw 15 and the element 25 are insulated from the shell 10 by means of insulating collars 27 and 28.

The removable portion of the device comprises a sleeve 30 which connects at its inner end with an annular insulating body 31 by screw threading or the like. The end of the sleeve 30 which is adjacent the insulating body 31 is provided with an annular flange 32 which supports one end of a compression coil spring 33. The opposite end of the spring is seated in the bottom of a cup-like element 34 which, with the spring in an expanded condition, seats against a ledge on the insulating body 31 at a point spaced from the adjacent end of the sleeve 30. With the parts in the position shown in the drawing, the cup-like element 34 and the coil spring 33 are ineffective.

At its inner end the insulating body 31 has secured thereto a cup shaped element 35 which is provided with an outwardly extending annular flange 36 intermediate its ends. The flange 36 serves as an electrical contact member in a manner which will presently appear. The outer end of the member 35 is closed by a wall portion 37 which serves to support the cigar or cigarette lighter portion of the device. This lighter portion comprises an electrical resistance element 40 which in the illustrated instance may be spirally wound. The outer end of the spirally wound resistance element 40 is permanently in electrical contact with an annular rim 41 of a supporting casing 42, the latter being secured to the element 35 by means of a rivet-like member 44. The inner end of the spirally wound resistance element 40 is in permanent electrical contact with the rivet-like member 44 and the casing member 42 is arranged to be insulated from the member 35 by means of insulating washers 45.

A hollow cylindrical shell 50 of insulating material is fixedly disposed within the sleeve 30. The shell 50 has disposed axially thereof an electric contact pin 51 which has electric contact with the member 35 as by means of a coil spring 52. The contact pin 51 is normally urged outwardly by a compression coil spring 53 which engages at its opposite ends an end wall of the shell 50 and an annular flange 54 carried by the contact pin 51, respectively.

The outer end of the sleeve 30 is arranged to support an incandescent lamp 55 of the kind conventionally employed in connection with automobile accessories and the details of the separable connection between the lamp 55 and the sleeve need not be described in detail. Electrical energy is conducted to the lamp 55 through the yieldable contact pin 51 and the outer shell of the base of the lamp is grounded to the sleeve 30, as is conventional.

It will be noted that with the removable portion of the device, which comprises principally the sleeve 30 and the insulating body 31, in the position shown in the drawing, an electric circuit is established through the connector 22, the screw 15, the member 25 with its radiating arms 26, the annular rim 41 of the casing 42, through the length of the spiral heating element 40, the rivet-like member 44, the coil spring 52, the contact pin 51, and thence through the lamp to ground. The cup-like element 34 has spaced around its peripheral walls resilient fingers 60 which yieldably engage the inner peripheral wall of the shell 10 and tend to retain the removable portion of the device in axially adjusted position.

With the circuit established as above described the lamp 55 will be illuminated but its resistance is sufficiently high to prevent current flow in the circuit of such a magnitude as to heat the element 40. Obviously, a slight withdrawal of the removable portion of the device will break the circuit by removing the annular rim 41 of the casing 42 from electrical engagement of the arms 26 with the member 25. In such slightly withdrawn position both the lighter and the lamp are inactive.

When it is desired to use the cigar or cigarette lighter portion of the device, it is moved substantially inwardly of the shell 10 from the position shown in the drawing. It is to be understood that the outer rounded ends 63 of the arms 26 occupy a position closer to each other and to the axis of the device than is shown in the drawing when they are unheated and unstressed by the rim 41 of the member 42. For this reason further insertion of the movable portion of the device results in a detent engagement between the rounded ends 63 of the arms 26 and the rim 41 of the member 42.

Such further insertion is accomplished against the resistance of the spring 33 because the flared outer end of the cup shaped member 34 is limited in its inward movement by engagement of the flange 12 with the shell 10 and therefore further joint inward movement of the sleeve 30 and the insulating body 31 results in compression of the spring 33. The detent action of the rounded ends 63 of the arms 26 is sufficient, however, when in fully inserted position, to overcome the yieldable tendency of the spring 33 to move the assembled sleeve 30 and insulating body 31 outwardly of the device.

Such inward movement of the movable portion of the device further results in electrical engagement between the annular flange 36 of the member 35 and a circumferentially spaced series of inward bumps or projections 66 formed in the shell 10 and, therefore, when the device is moved to its full inward position, the lamp 55 is cut out of the energized portion of the circuit. That is, the resistance heating element 40 is short-circuited by grounding of the circuit at 36, 66 so that current flow therethrough is then sufficient to effect heating of the element 40 to a degree satisfactory for use as a cigar or cigarette lighter.

Such increased current flow also results in heating of the bi-metallic arms 26 and they are arranged to move apart under such heating effect at a sufficient rate to automatically release the movable portion of the device when the heating element 40 is heated to a desired degree. The spring 33 will then automatically and immediately move the movable portion of the device outwardly in the receptacle and the momentum of such impulse is sufficient to carry the movable portion out to a point where electrical engagement between the arms 26 and the rim 41 is completely broken.

Many modifications of the specific form of my invention shown and described by way of illustration of its principles may be effected without departing from its scope as defined in the appended claims:

I claim:

1. In a combined cigar lighter and instrument panel light, a receptacle adapted to be secured to an instrument panel, an electrical terminal therein connectible to a source of electrical energy, a plug adapted to be received and housed by said receptacle, said plug being readily removable from said housing and being disposable in a plurality of positions therein, said plug comprising a resistance heating element at its inner end and a lamp at its outer end, said lamp having one terminal grounded and its other terminal connected with an end of said heating element, the other end of said heating element being movable to and from positions of engagement with said electrical terminal by movement of said plug in said receptacle, a ground terminal in said receptacle, and an electrical contact portion between said lamp and said heating element, said contact portion being movable to and from engagement with said ground terminal by movement of said plug in said receptacle with said other end of the heating element in engagement with said electrical terminal to render said lighter and said lamp respectively active.

2. In a combined cigar lighter and instrument panel light, a receptacle adapted to be secured to an instrument panel, a yieldable electrical terminal in the base thereof, a plug adapted to be received and housed by said receptacle, said plug being readily removable from said housing and selectively disposable in fully inserted and partially inserted positions in said receptacle, said plug comprising a heating element at its inner end and a lamp at its outer end, said lamp having one terminal grounded and its other terminal connected with an end of said heating element, the other end of said heating element being adapted to engage said yieldable electrical terminal when said plug is inserted in said receptacle to a predetermined degree, said yieldable terminal permitting further movement of said plug into said receptacle, and a ground terminal engageable between said lamp and said heater upon such further inward movement of said plug to short circuit said heater around said lamp for heating the former, and means for retaining said plug in selected positions of relative insertion in said receptacle.

3. In a combined cigar lighter and instrument panel light, a receptacle adapted to be secured to an instrument panel, an electrical terminal therein, a plug adapted to be received and housed by said receptacle, said plug being readily removable from said housing and selectively disposable in fully inserted and partially inserted positions in said receptacle, said plug comprising a heating element at its inner end and a lamp at its outer end, said lamp having one terminal grounded and its other terminal connected with an end of said heating element, the other end of said heating element being adapted to engage said receptacle terminal when said plug is inserted in said receptacle to and within a predetermined range of movement of said plug in said receptacle, and a ground terminal engageable between said lamp and said heater in one portion of said predetermined range of movement to short circuit said heater around said lamp for heating the former, said lamp being illuminated by a circuit including said heater in other portions of said predetermined range of movement.

JAMES C. SMITH.